United States Patent [19]

Hein et al.

[11] Patent Number: 5,887,835
[45] Date of Patent: Mar. 30, 1999

[54] TELESCOPIC STAND

[75] Inventors: Dieter Hein; Leonhard Jaumann, both of Munich, Germany

[73] Assignee: Sachtler AG, Unterschleissheim, Germany

[21] Appl. No.: 871,010

[22] Filed: Jun. 6, 1997

[30] Foreign Application Priority Data

Jun. 7, 1996 [DE] Germany ................ 196 22 894.8

[51] Int. Cl.[6] ............................................. F16M 11/26
[52] U.S. Cl. ...................... 248/161; 248/168; 248/188.5; 403/104
[58] Field of Search ............................... 248/161, 163.1, 248/168, 188, 188.5, 177.1, 169, 178.1, 337, 411; 24/273, 280; 396/421, 428; 403/104, 109, 315, 363, 374, 108, 379, 378, 328, 321, 322.1

[56] References Cited

U.S. PATENT DOCUMENTS

| 731,879 | 6/1903 | Folmer | 248/188 |
|---|---|---|---|
| 1,632,717 | 6/1927 | Stumpf | 248/168 |
| 2,519,549 | 8/1950 | Coutant et al. | 248/188.5 |
| 3,963,207 | 6/1976 | Guasti | 248/168 |
| 4,029,279 | 6/1977 | Nakatani | 248/188.5 |
| 4,185,936 | 1/1980 | Takahashi | 403/104 |
| 4,596,484 | 6/1986 | Nakatani | 403/104 |
| 4,761,082 | 8/1988 | Nakatani | 403/104 |
| 4,767,090 | 8/1988 | Hartman et al. | |
| 4,832,296 | 5/1989 | Schnepp | 248/168 |
| 4,932,622 | 6/1990 | Hayakawa | |
| 5,253,833 | 10/1993 | Indou | 248/168 |
| 5,320,316 | 6/1994 | Baker | 248/163.1 |
| 5,503,357 | 4/1996 | Johnson et al. | 248/188.5 |

FOREIGN PATENT DOCUMENTS

| 2647664 | 12/1977 | Germany . |
| 1127497 | 9/1968 | United Kingdom . |
| WO 93/12372 | 6/1993 | WIPO . |

Primary Examiner—Ramon O. Ramirez
Assistant Examiner—Long Dinh Phan
Attorney, Agent, or Firm—Dilworth & Barrese

[57] ABSTRACT

The invention relates to a telescopic stand comprising at least three telescopic units per stand leg, wherein a clamping device which can be actuated via just one clamping lever per stand leg is provided at two fixing locations (A, B) of the central stand unit. For this purpose, the clamping device is connected together at the two fixing locations (A, B) by an actuating bar (42). This considerably simplifies the stand's handling in that far fewer clamping levers with respect to the prior art have to be actuated.

5 Claims, 2 Drawing Sheets

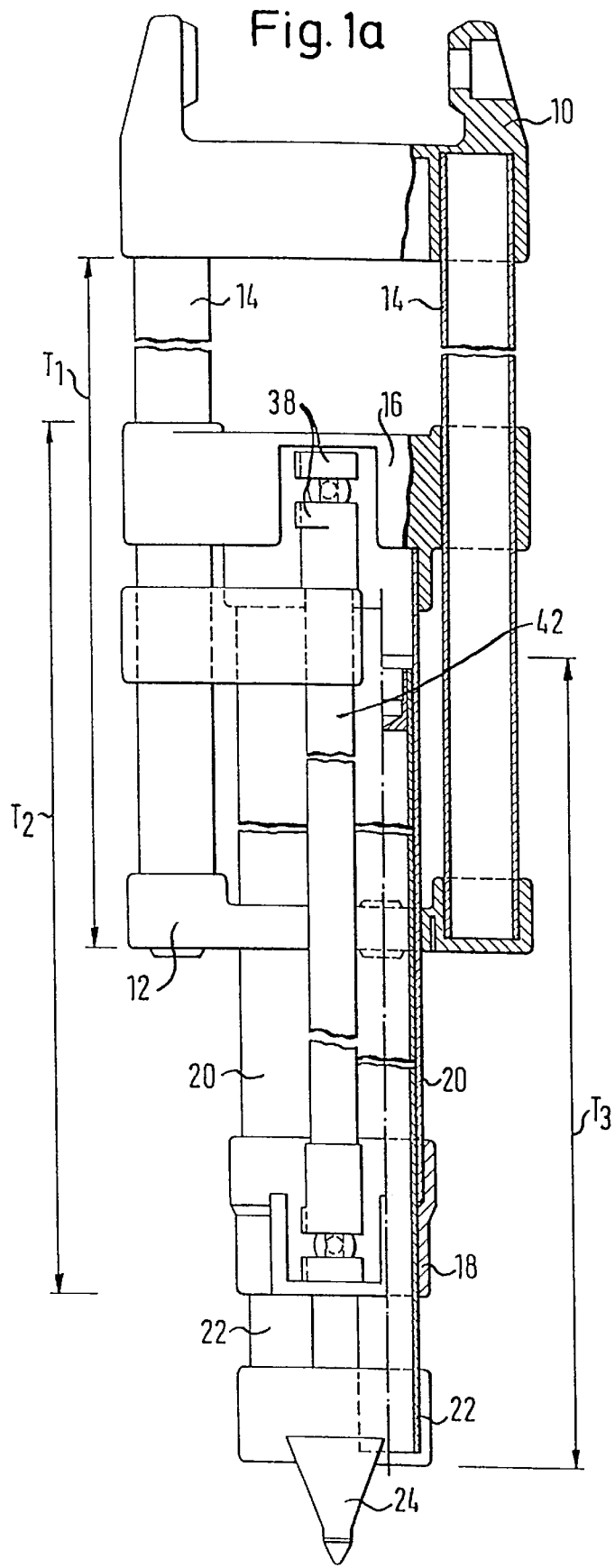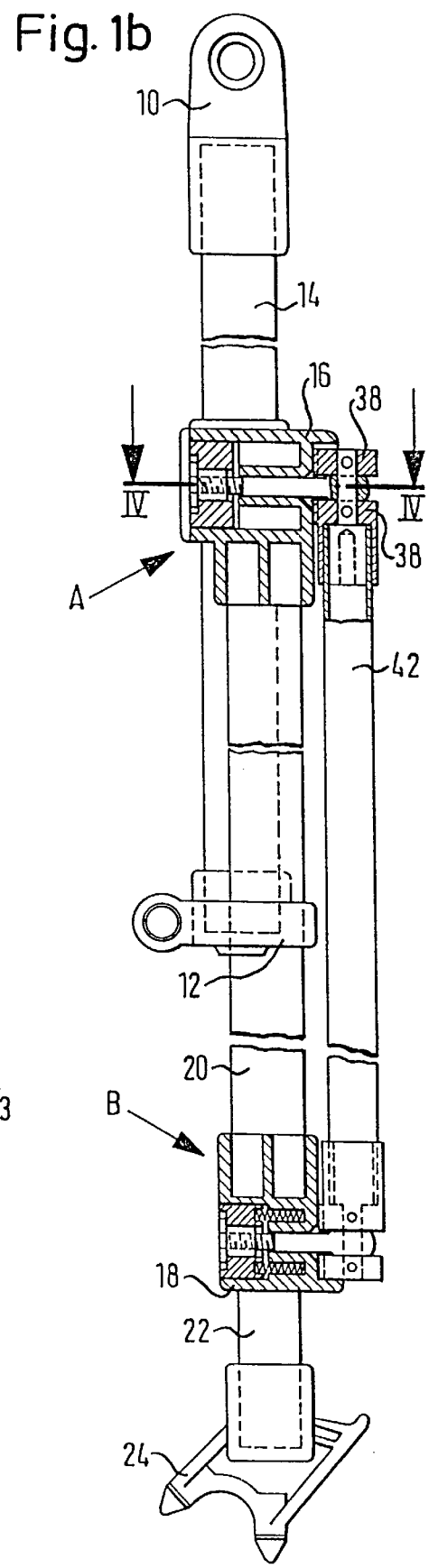

TELESCOPIC STAND

BACKGROUND OF THE INVENTION

The invention relates to a telescopic stand comprising at least one stand leg that has at least three telescopic units and at least two fixing locations spaced in the longitudinal extension of the stand and at which the telescopic units are slidable and preferably continuously variable in relation to one another by means of fixing devices, whereby from the stand shell, a crossbar rigidly connected to the start of the second telescopic unit can be longitudinally moved on the first telescopic unit, with another crossbar in which another telescopic unit can be longitudinally moved is rigidly connected to the end of this second telescopic unit, with both crossbars forming the fixing locations.

Such a telescopic stand is known from WO 93/12372. Six fixing levers were usually provided for usually two fixing locations per stand leg and one tripod stand. Whenever for example the telescopic legs are completely pushed in and locked in this state, all the fixing levers were released so that the stand legs are telescopically extended essentially as a result of the dead weight. To perform selective adjustments subsequently, it was necessary to actuate the various fixing levers at different levels, whereby it was possible to adjust the lower levers in particular only by bending down a long way.

SUMMARY OF THE INVENTION

It is the present invention's object to provide a telescopic stand that can be operated much more easily in terms of assembly and adjustments.

This object is solved according to the invention in that at least two fixing devices of the fixing locations are connected together by a coupling/actuating bar and in that the coupling/actuating bar is connected to an actuating lever at one of the fixing locations and preferably at the upper-most fixing location.

The number of actuation levers can be considerably reduced by this solution and operation can therefore be greatly simplified, whereby it has proved advantageous for handling to be greatly simplified by the arrangement of the actuating lever at the upper fixing location to the extent that the operating person does not have to bend over too far in order to perform an adjustment. This amazingly simple solution is made possible by the knowledge that the distance between two crossbars remains equal and that such a coupling/actuating bar can therefore be at all attached in order to operate two fixing locations simultaneously via this coupling/actuating bar by means of one actuating lever.

According to a further embodiment of the invention, the coupling/actuating bar is designed as a torsion rod which in the area of the fixing locations is connected to one eccentric respectively which actuates at least one clamping member.

The coupling/actuating bar can be disposed beyond the second telescopic unit's telescopic rods, which essentially simplifies the structural design and production. It is also possible, however, to dispose the coupling/actuating bar within a telescopic rod of the second telescopic unit.

At least the eccentric on which the actuating lever is disposed expediently comprises a lock-in position portion so that the fixing mechanism can be locked by overcoming a dead center.

BRIEF DESCRIPTION OF THE DRAWINGS

The invention will be explained in the following by means of an exemplary embodiment depicted purely schematically in the drawings.

FIG. 1a shows a partially sectioned view of a stand leg of a tripod stand in a partly retracted state;

FIG. 1b shows a corresponding partially sectioned side view of this stand leg;

DESCRIPTION OF THE PREFERRED EMBODIMENTS

Figure 2:
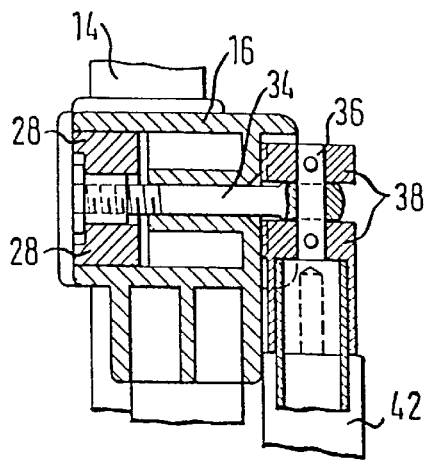
FIG. 2 shows a slightly enlarged sectional view of detail A in FIG. 1b.

The stand leg shown in FIGS. 1a and 1b essentially comprises three telescopic units $T_1$, $T_2$ and $T_3$. The telescopic unit $T_1$, consists of a connecting piece 10, a flat slide 12 and two telescopic tubes 14 connecting them at a distance from one another. On these telescopic tubes there slides a crossbar 16 as a clamping piece and as an initial piece of the second telescopic unit $T_2$. The end of this telescopic unit $T_2$ is formed by another crossbar 18. The two crossbars 16, 18 are connected at distance from one another by two e.g. hollow telescopic rods 20. This second telescopic unit $T_2$ therefore slides with the crossbar 16 on the telescopic tubes 14 and within the flat slide 12 of the first telescopic unit $T_1$. One telescopic tube 22 of the third telescopic unit $T_3$, which is located within a base 24 at the outer-most end, slides in each of the telescopic tubes 20 of the second telescopic unit $T_2$.

The telescopic tubes 22 project through the crossbar 18 via corresponding openings in which the telescopic tubes 22 in the crossbar 18 can be securely clamped in order to ensure the relative position between the second telescopic unit $T_2$ and the third telescopic unit $T_3$. The telescopic tubes 14 can be securely clamped in the crossbar 16 in order to adjust and lock the relative position between the first telescopic unit $T_1$ and the second telescopic unit $T_2$. The second telescopic unit $T_2$ has a constant length and the stand legs are lengthened or shortened via the telescopic units $T_1$ and $T_2$.

Figure 4A:
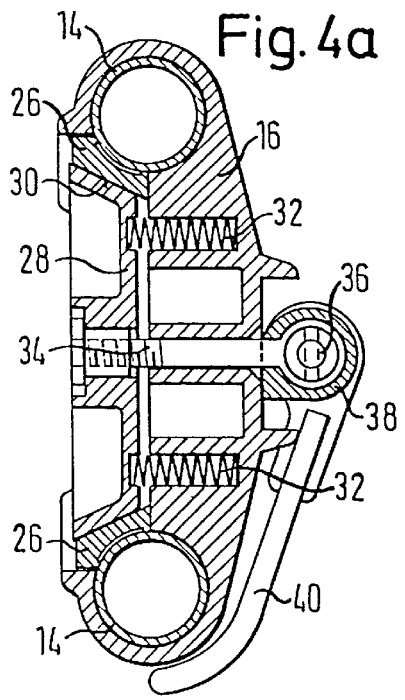
FIG. 4a shows a sectional view along the line IV—IV in FIG. 1b in the clamped state.
Figure 4B:
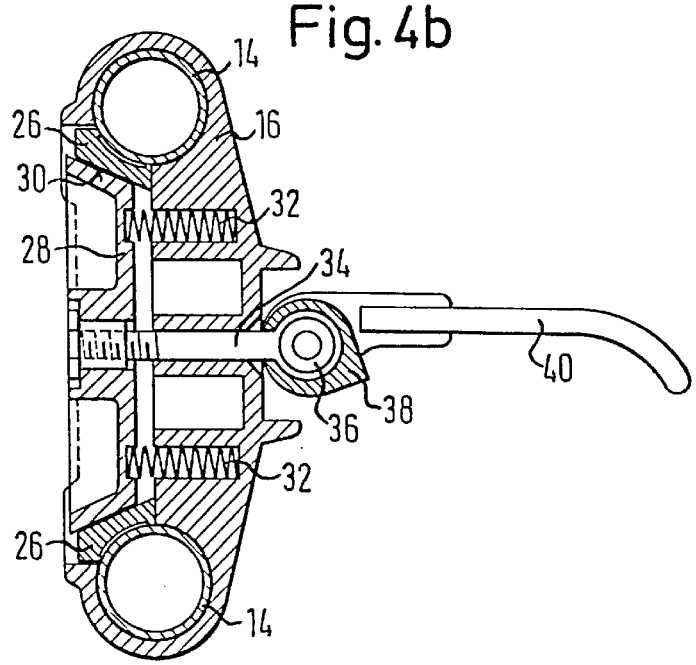
FIG. 4b shows a sectional view corresponding to FIG. 4a in the released state.

The more precise structure of the crossbars 16 and 18 formed as clamping pieces is shown for example by the crossbar 16 in FIGS. 4a and 4b. The encirclement of the telescopic rods 14 by the crossbar 16 leaves almost a quarter of the periphery free, with the result that one clamping member 26 respectively is able to engage therewith. A clamping device 28 is located at that side of the clamping member 26 facing away from the telescopic tube 14 and has an effective surface 30 which can interact with a corresponding complementary beveled surface of the clamping member 26 such that the clamping member 26 can be pressed in contact with the outer periphery of the telescopic rods 14. This clamping device 28 is normally biased by springs 32 such that the aforementioned effective surfaces do not act upon each other and hence the clamping member 26 is released from the telescopic rod 14 such that the crossbar 16 is freely movable along the telescopic rods 14. The actuating device simultaneously actuates the clamping members for securely clamping the crossbar to both telescopic rods 14. For this purpose, the clamping device 28 is actuated by a tie rod 34 against the force of the springs 32. An eccentric 38 connected to a clamping lever 40 is located on a pin 36 at that end of the tie rod 34 which is opposite the clamping device 28. The pivoting axis of the clamping lever 40 is located in the center of the pin and in this exemplary embodiment is perpendicular to the longitudinal axis of the tie rod 34 and parallel to the longitudinal axes of the telescopic rods 14.

Clamping occurs in the position of the clamping lever 40 in FIG. 4a. Clamping is canceled in the position of the clamping lever 40 in FIG. 4b. Before the eccentric 38 reaches the final position shown in FIG. 4a and in contact with the crossbar 16, the eccentric overcomes a dead center to the extent that overcoming this dead center causes the clamping position depicted in FIG. 4a to be locked so that the clamping cannot be released of its own accord even when the stand leg is jolted.

The two eccentrics 38, one of which is located on the crossbar 16 and the other on the crossbar 18, are for example connected together by a fixed length torsion rod 42 so that the two instances of clamping are performed simultaneously when the clamping lever 40 is actuated. In the exemplary embodiment, this torsion rod 42 is positioned outside the telescopic rods, but it could also be disposed within the telescopic rods 20.

Figure 3:
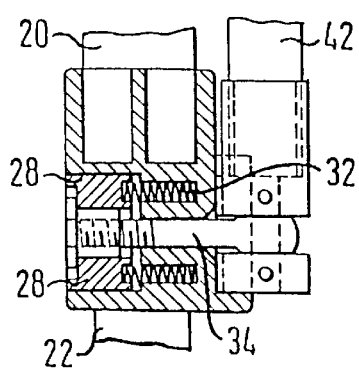
FIG. 3 shows a slightly enlarged view of detail B in FIG. 1b.

The aforementioned details are also shown in a slightly enlarged form in partial representations A and B in FIGS. 2 and 3.

If the stand is in the retracted state, just three clamping levers have to be released at the upper-most site in order that the telescopic legs can extend. The telescopic units of the stand legs are then in turn fixed by actuating just three clamping levers. If a selective adjustment is to take place at the various stand legs, this can be easily achieved by the aforementioned clamping levers at a relatively high-up site.

The invention is not, of course, limited to this exemplary embodiment. Instead of via a torsion rod, the functions can also, of course, be connected via other kinematics, for instance a cable pull or a chain pull.

What is claimed is:

1. A telescopic stand comprising at least one stand leg, having at least three telescopic units ($T_1, T_2, T_3$) and at least two fixing locations (A, B) spaced in the longitudinal extension of said stand and at which said telescopic units ($T_1, T_2, T_3$) are slidable in relation to one another by fixing means, wherein a crossbar (16) rigidly connected to the start of said second telescopic unit ($T_2$) is longitudinally movable on said first telescopic unit ($T_1$) from a stand shell, wherein a further crossbar (18) in which a further telescopic unit ($T_3$) is longitudinally movable and is rigidly connected to the end of this second telescopic unit ($T_2$), said two crossbars (16, 18) forming said fixing locations (A, B), characterized in that said at least two fixing means of said fixing locations (A, B) are connected together by a coupling/actuating member (42) and said coupling/actuating member (42) is connected to a clamping lever (40).

2. A telescopic stand according to claim 1, characterized in that said coupling/actuating member is a coupling/actuating bar (42).

3. A telescopic stand according to claim 2, characterized in that said coupling/actuating bar (42) is designed as a torsion rod connected to one eccentric (38) respectively in the area of said fixing locations (A, B), said eccentric actuating at least one clamping member (28, 26).

4. A telescopic stand according to claim 1, characterized in that said coupling/actuating member (42) is disposed outside telescopic rods (20) of said second telescopic unit ($T_2$).

5. A telescopic stand according to claim 3, characterized in that at least said eccentric (38), on which said clamping lever (40) is disposed, comprises a lock-in position portion for overcoming a dead center.

* * * * *